(12) United States Patent
Kim et al.

(10) Patent No.: US 10,892,674 B2
(45) Date of Patent: Jan. 12, 2021

(54) LINEAR VIBRATION GENERATOR INCLUDING PLATE TYPE SPRING HAVING BENT PORTION

(71) Applicant: MPLUS CO., LTD., Suwon-si (KR)

(72) Inventors: Nam Sock Kim, Suwon-si (KR); Seuk Hwan Chung, Suwon-si (KR)

(73) Assignee: MPLUS CO., LTD., Suwon-si (KR)

( * ) Notice: Subject to any disclaimer, the term of this patent is extended or adjusted under 35 U.S.C. 154(b) by 208 days.

(21) Appl. No.: 16/166,322

(22) Filed: Oct. 22, 2018

(65) Prior Publication Data
US 2019/0123628 A1 Apr. 25, 2019

(30) Foreign Application Priority Data
Oct. 25, 2017 (KR) .................. 10-2017-0139536

(51) Int. Cl.
*H02K 33/02* (2006.01)
*H02K 1/34* (2006.01)
*H02K 33/16* (2006.01)

(52) U.S. Cl.
CPC ............... *H02K 33/02* (2013.01); *H02K 1/34* (2013.01); *H02K 33/16* (2013.01)

(58) Field of Classification Search
CPC ........ H02K 33/14; H02K 33/12; H02K 33/16; H02K 33/02; H02K 1/34
See application file for complete search history.

(56) References Cited

U.S. PATENT DOCUMENTS 10,693,359 B2 * 6/2020 Chung .................. B06B 1/045

FOREIGN PATENT DOCUMENTS

| CN | 204993010 U | 1/2016 |
| CN | 205081656 U | 3/2016 |
| KR | 10-1163612 B1 | 7/2012 |
| KR | 10-1484858 B1 | 1/2015 |
| WO | 2016/194762 A1 | 12/2016 |

OTHER PUBLICATIONS

SIPO Office Action, dated Apr. 26, 2020, for Chinese Patent Application No. 201811246707.5.

* cited by examiner

*Primary Examiner* — Forrest M Phillips
(74) *Attorney, Agent, or Firm* — LRK Patent Law Firm

(57) ABSTRACT

A linear vibration generator including a plate type spring each having bent portions includes: a case for covering top and side portions thereof; a bracket coupled to the underside of the case; a coil fixed to one side of a top surface of the bracket and receiving external power from an FPCB; a plate type spring having bent portions and configured to allow one end thereof to be fixed to a vibrator; and the vibrator having a weight fixed to one end of the plate type springs and a magnet insertedly fixed to a hollow portion of the weight.

5 Claims, 9 Drawing Sheets

(a)

(b)

(a)

(b)

(c)

LINEAR VIBRATION GENERATOR INCLUDING PLATE TYPE SPRING HAVING BENT PORTION

CROSS REFERENCE TO RELATED APPLICATION

The present application claims the benefit of Korean Patent Application No. 10-2017-0139536, filed in the Korean Intellectual Property Office on Oct. 25, 2017, the entire content of which is incorporated herein by reference.

BACKGROUND OF THE INVENTION

1. Field of the Invention

The present invention relates to a linear vibration generator having a plate type spring disposed on a space between a case and a bracket, wherein the plate type spring has bent portions, and more particularly, to a linear vibration generator that is capable of preventing a vibrator and an inner surface of a case from coming into contact with each other through the plate type spring having bent portions designed to a specific shape, thereby solving a conventional problem that generates twist on a spring connecting the vibrator and the case (or a bracket) to undesirably cause noise and damage by means of contact between the vibrator moving up and down and the inner surface of the case, if the vibrator disposed therein moves up and down.

2. Description of Related Art

As a vibration device including a linear vibration generator (linear vibration motor) as means for generating vibrations, such as a smart phone, vibration bell, and the like has been generally used, the vibration device has been actively developed and prevailed.

When a vibrator disposed inside the linear vibration generator moves up and down, however, the vibrator does not perform accurate vertical movements due to structural properties of a spiral-shaped spring, so that undesirably, it becomes twisted.

There are some problems that such twisting causes a weight constituting a portion of the vibrator and having a large outer diameter to come into contact with an inner surface of a case, and due to impacts generated upon the contact, the vibrator may be damaged. Also, noise may be generated from the contact. Such problems become more serious especially on a rectangular vibration generator, and accordingly, there is a definite need to develop a structure of a spring capable of suppressing the damage of the vibrator or the generation of noise in the rectangular vibration generator.

SUMMARY OF THE INVENTION

Accordingly, the present invention has been made in view of the above-mentioned problems occurring in the prior art, and it is an object of the present invention to provide a linear vibration generator that is provided with springs having improved structures, thereby solving a conventional problem that generates twist on a spiral-shaped spring to undesirably cause noise and damage by means of contact between a weight constituting a portion of a vibrator and having a large outer diameter and an inner surface of a case, if the vibrator disposed therein moves up and down.

To accomplish the above-mentioned object, according to a first aspect of the present invention, there is provided a linear vibration generator including: a case for covering top and side portions thereof; a bracket coupled to the underside of the case; a coil fixed to one side of a top surface of the bracket and receiving external power from an FPCB; a plate type spring having bent portions and configured to allow one end thereof to be fixed to a vibrator; and the vibrator having a weight fixed to one end of the plate type spring and a magnet insertedly fixed to a hollow portion of the weight.

According to the present invention, desirably, the plate type spring is symmetrical as a whole around a center axis of the hollow portion of the weight.

According to the present invention, the plate type spring is composed of an even number of plate type sub-springs spaced apart from each other by a given distance around the center axis of the weight, and the even number of plate type sub-springs are symmetrical with each other around the center axis of the weight.

For example, a pair of plate type sub-springs are symmetrically disposed facing each other and spaced apart from each other by a given distance around the center axis of the weight.

According to the present invention, desirably, the weight has a shape of a rectangle and comprises first machined portions formed on four corners of the rectangular shape thereof or at least two or more second machined portions formed on both sides of the center thereof.

To accomplish the above-mentioned object, according to a second aspect of the present invention, there is provided a linear vibration generator including: a case for covering top and side portions thereof; a bracket coupled to the underside of the case; a coil fixed to one side of a top surface of the bracket and receiving external power from an FPCB; a plate type spring having bent portions and a support cup and configured to allow one end thereof to be fixed to a vibrator; and the vibrator having a weight fixed to one end of the plate type spring and a magnet insertedly fixed to a hollow portion of the weight.

According to the present invention, desirably, the plate type spring is formed of one unitary spring having a through hole formed on the center thereof to insert the coil thereinto.

According to the present invention, the support cup is formed to be fixed to the magnet, while supporting the weight there against.

According to the present invention, the plate type spring is composed of an even number of plate type sub-springs symmetrical with and spaced apart from each other by a given distance around the center axis of the weight.

According to the present invention, the weight has a shape of a rectangle and includes first machined portions formed on four corners of the rectangular shape thereof or at least two or more second machined portions formed on both sides of the center thereof.

According to the present invention, the plate type spring has one or more curved portions.

According to the present invention, the other end of each plate type spring is fixedly coupled to the case or the bracket.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
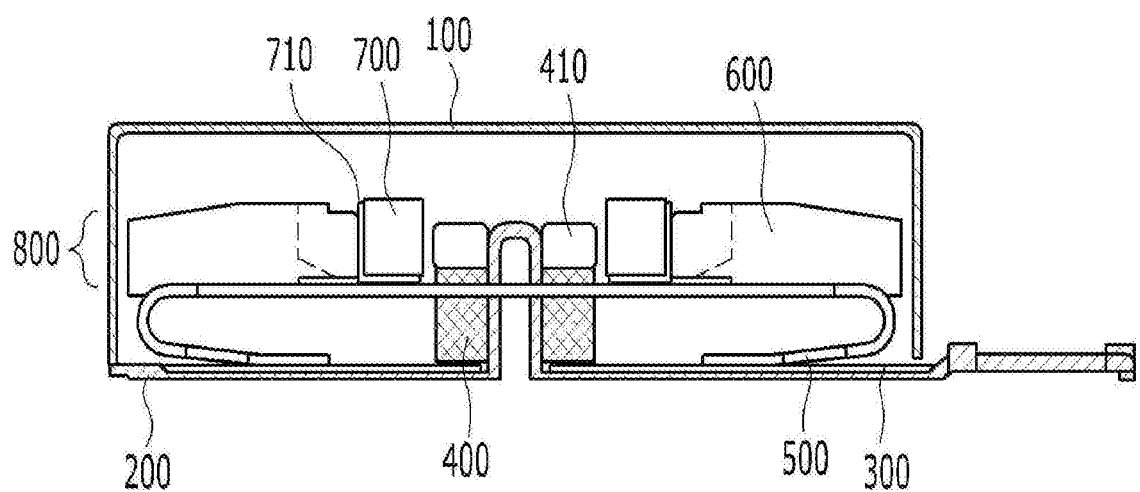
FIG. 1 is a front sectional view showing a linear vibration generator according to a first embodiment of the present invention.

Hereinafter, the present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

Terms, such as the first, the second, A, B, (a), and (b) may be used to describe various elements, but the elements should not be restricted by the terms. The terms are used to only distinguish one element from the other element, without any limitation in the properties or order of the corresponding element.

When it is said that one element is described as being "connected" or "coupled" to the other element, one element may be directly connected or coupled to the other element, but it should be understood that another element may be present between the two elements.

Figure 2:
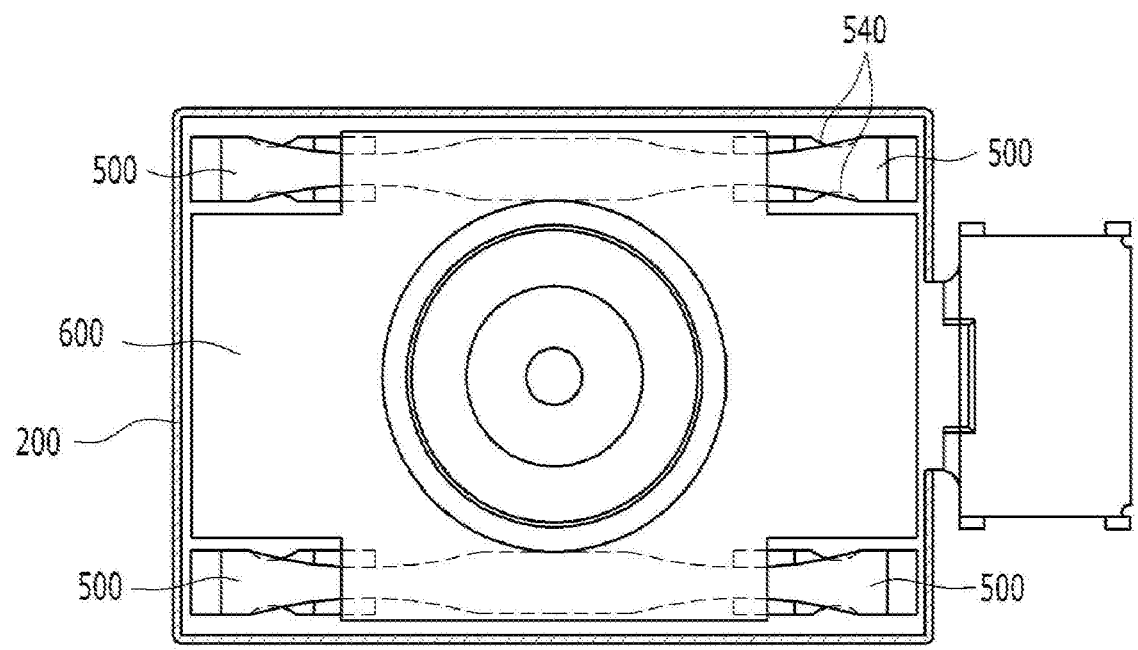
FIG. 2 is a top view showing the linear vibration generator according to the first embodiment of the present invention.
Figure 3:
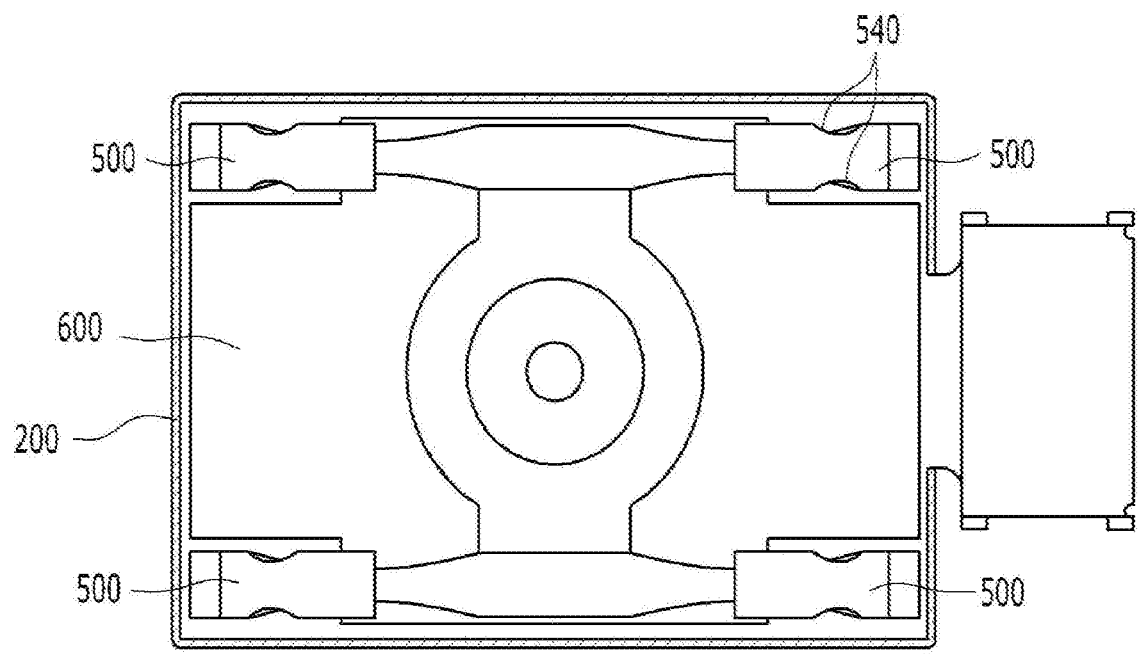
FIG. 3 is a bottom view showing the linear vibration generator according to the first embodiment of the present invention.

FIG. 1 is a front sectional view showing a linear vibration generator according to a first embodiment of the present invention, FIG. 2 is a top view showing the linear vibration generator according to the first embodiment of the present invention, and FIG. 3 is a bottom view showing the linear vibration generator according to the first embodiment of the present invention.

As shown in FIGS. 1 to 3, a linear vibration generator according to the first embodiment of the present invention is provided not with spiral-shaped springs, but with plate type springs having a symmetrical structure.

The linear vibration generator according to the first embodiment of the present invention includes a case 100 for covering top and side portions thereof, a bracket 200 coupled to the underside of the case 100, a coil 400 fixed to one side of a top surface of the bracket 200 and receiving external power from an FPCB 300, a plate type spring 500 having bent portions 510 and configured to allow one end thereof to be fixed to a vibrator 800, and the vibrator 800 having a weight 600 fixed to one end of the plate type spring 500 and a magnet 700 insertedly fixed to a hollow portion 610 of the weight 600.

Under the above-mentioned configuration, now, an operating process of the linear vibration generator according to the first embodiment of the present invention will be explained.

The external power is applied to the linear vibration generator from the FPCB 300.

Next, an electric current flows to the coil 400 located inside the linear vibration generator by means of the external power applied through the FPCB 300, and a magnetic field caused by the electric current flowing to the coil 400 interacts with the magnet 700 disposed around the coil 400, thereby allowing the magnet 700 to move up and down.

The magnet 700 is fixed to the plate type spring 500 in a state of being coupled to the weight 600, and accordingly, the magnet 700 moves up and down with a substantially big force by means of the weight 600 coupled thereto.

At this time, the structural properties of the plate type spring having the bent portions 510 enable the vibrator 800 having the weight 600 and the magnet 700 coupled to each other to move in a completely vertical direction, without any twist.

Now, the installation shape of the plate type spring 500 will be in detail explained with reference to FIGS. 2 and 3.

The plate type spring 500 is symmetrical as a whole around a center axis of the hollow portion 610 of the weight 600.

The plate type spring can be a unitary spring, and otherwise, an even number of plate type sub-springs are symmetrically spaced apart from each other.

As mentioned above, the structural properties of the plate type spring enables the vibrator 800 to stably move up and down, without any twist.

On the other hand, a magnet yoke 710 is disposed between the magnet 700 and the plate type spring 500 to allow the magnet 700 to be stably fixed to the plate type spring 500, and a coil yoke 410 is disposed on top of the coil 400 to allow the magnetic field generated from the coil 400 to be focused thereonto to enhance a magnetic interaction efficiency between the magnet 700 and the coil 400.

In addition, each plate type spring 500 has one or more curved portions 540, and through the structures of the curved portions 540 reduced gently in width thereof, the bent portions 510 can operate efficiently.

The weight 600 has a shape of a rectangle and desirably includes first machined portions 620 formed on four corners thereof or at least two or more second machined portions (630) formed on both sides of the center thereof. Formation of the first machined portions 620 or second machined portions (630) prevents the weight 600 from coming into contact with the plate type spring 500 upon the downward movement of the weight 600.

Figure 4:
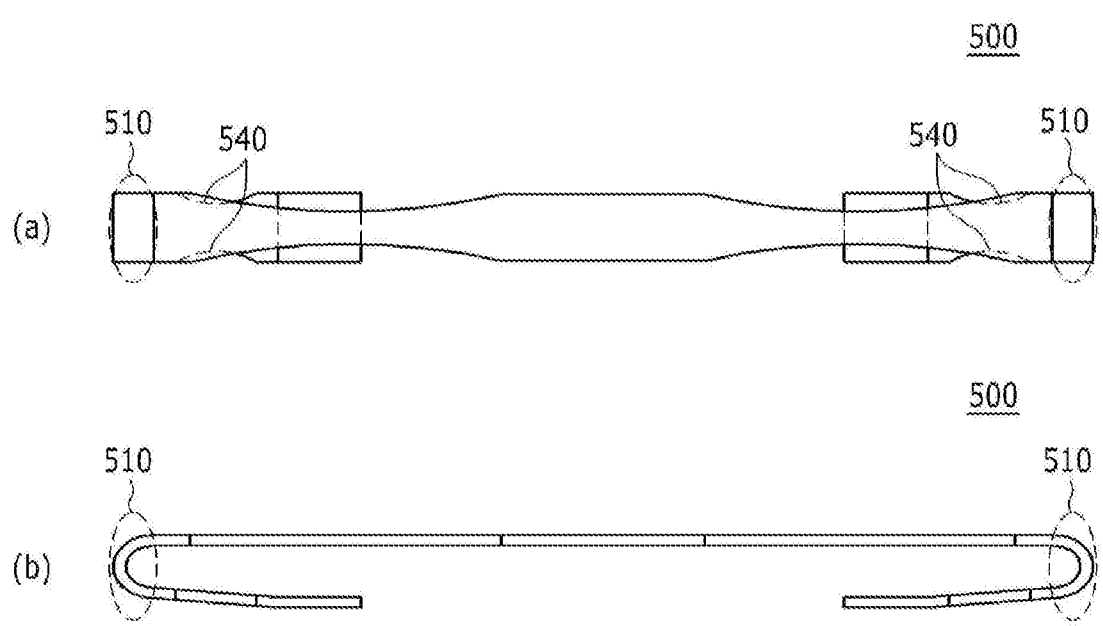
FIG. 4 is top and front views showing a plate type spring inserted into the linear vibration generator according to the first embodiment of the present invention.
Figure 5:
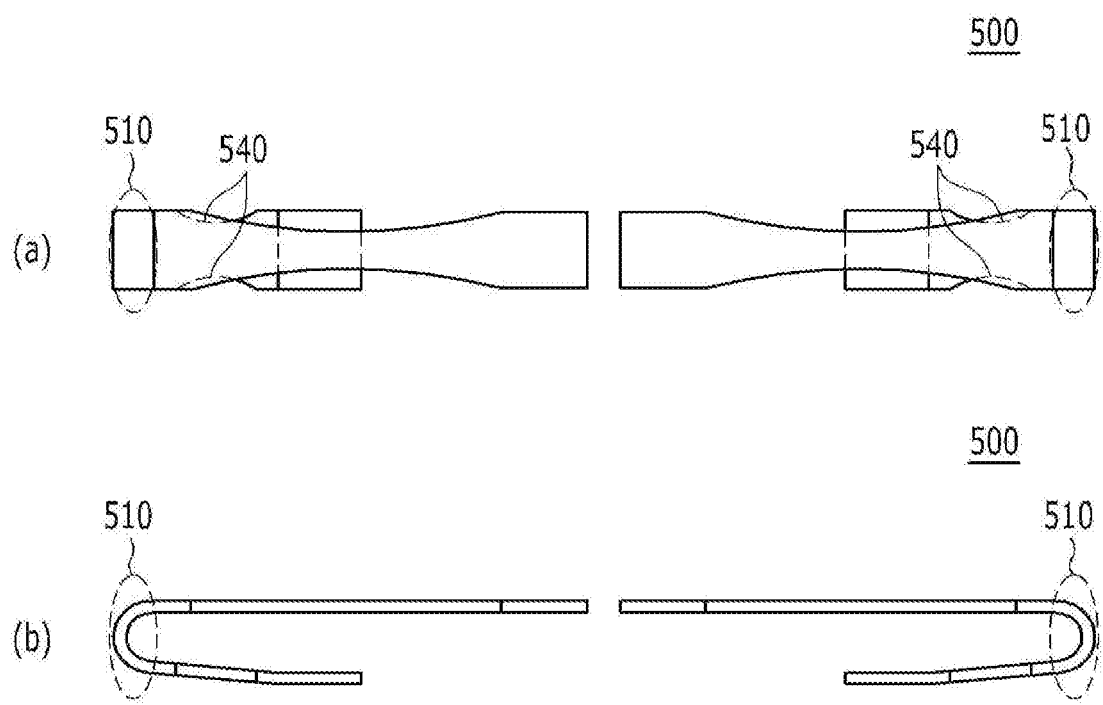
FIG. 5 is top and front views showing a pair of plate type sub-springs inserted into the linear vibration generator according to the first embodiment of the present invention.

FIG. 4 is top and front views showing the plate type spring inserted into the linear vibration generator according to the first embodiment of the present invention, and FIG. 5 is top and front views showing a pair of plate type sub-springs inserted into the linear vibration generator according to the first embodiment of the present invention.

As shown in FIG. 4, the plate type spring 500 is a unitary body having the two bent portions 510, and as shown in FIG. 5, the plate type spring 500 is cut in the middle thereof to provide a pair of plate type sub-springs facing each other.

The plate type spring 500 as unitary body having the two bent portions 510 as shown in FIGS. 4a and 4b has a symmetrical shape around the center axis of the hollow portion 610 of the weight 600. The plate type spring 500, which is cut in the middle thereof to provide a pair of plate type sub-springs facing each other as shown in FIGS. 5a and 5b so as to support the weight 600 against two points thereof, are symmetrically spaced apart from each other by a given distance around the center axis of the hollow portion 610 of the weight 600.

Figure 6:
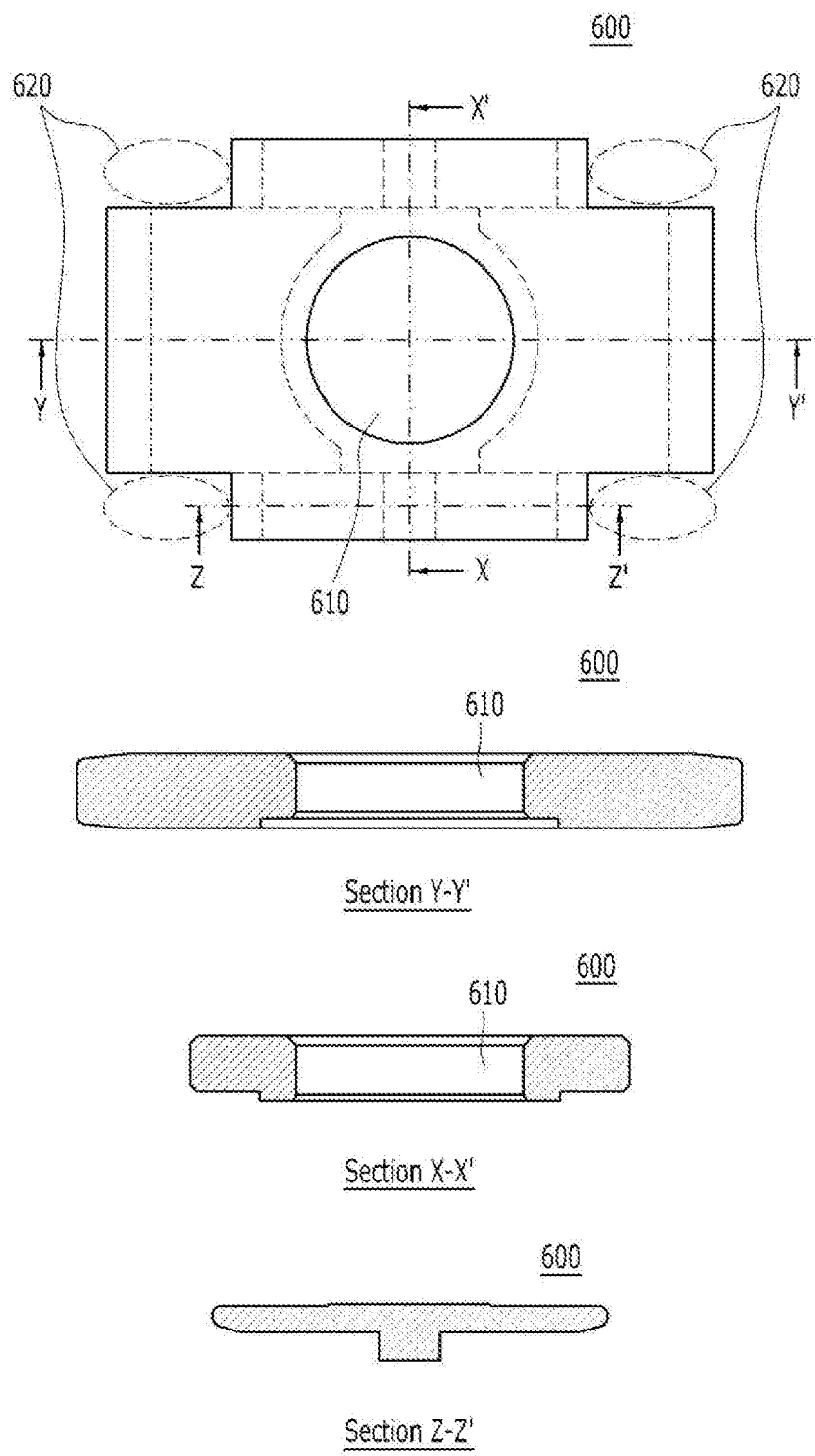
FIG. 6 is a top view showing a weight inserted into the linear vibration generator according to the first embodiment of the present invention and sectional views showing the weight with respect to axes.
Figure 7:
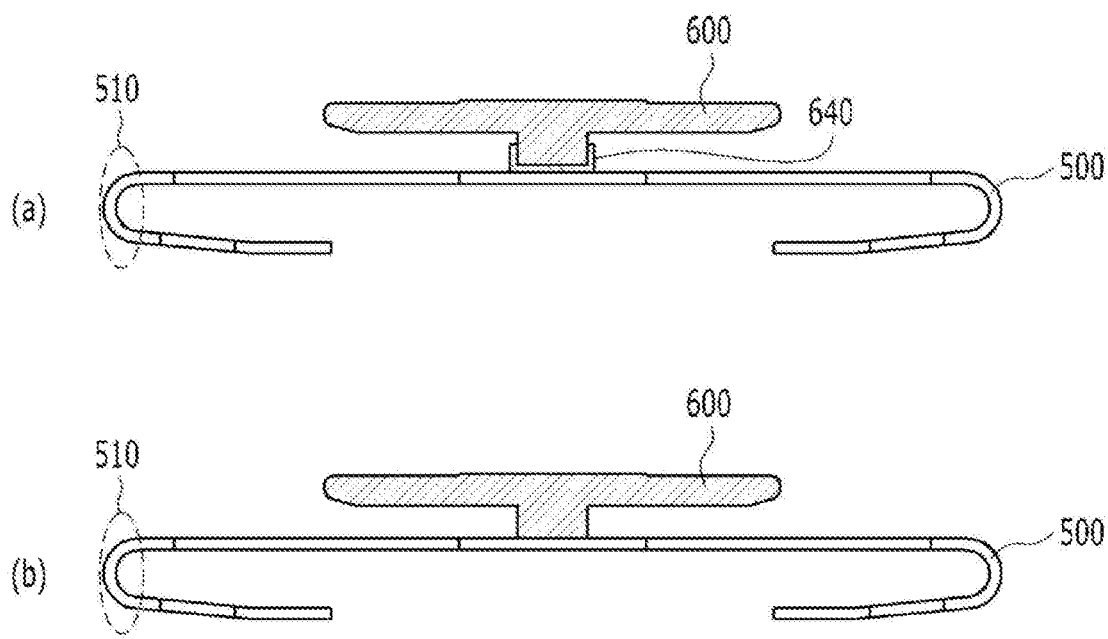
FIG. 7 is front views showing a coupling relationship between the weight and the plate type spring of the linear vibration generator according to the first embodiment of the present invention.

FIG. 6 is a top view showing the weight inserted into the linear vibration generator according to the first embodiment of the present invention and sectional views showing the weight with respect to axes, and FIG. 7 is front views showing a coupling relationship between the weight and the plate type spring of the linear vibration generator according to the first embodiment of the present invention.

As shown in FIGS. 6 and 7, the weight 600 has a shape of a general rectangle and desirably includes the first machined portions 620 formed on four corners thereof.

As mentioned above, the formation of the first machined portions 620 prevents the weight 600 from coming into contact with the plate type spring 500 upon the downward movement of the weight 600.

FIG. 6 shows the sectional shapes of the weight 600 with respect to axes YY', XX', and ZZ'.

As shown in FIG. 7, the weight 600 is coupled to the plate type spring 500 through a structure protruding from a lower end portion thereof, when viewed with respect to the axes ZZ'.

As shown in (a) of FIG. 7, a weight yoke 640 is disposed between the weight 600 and the plate type spring 500 to allow the plate type spring 500 to be more stably fixed to the weight 600, and as shown in (b) of FIG. 7, of course, the weight 600 and the plate type spring 500 are coupled directly to each other, without any weight yoke 640.

Figure 8:
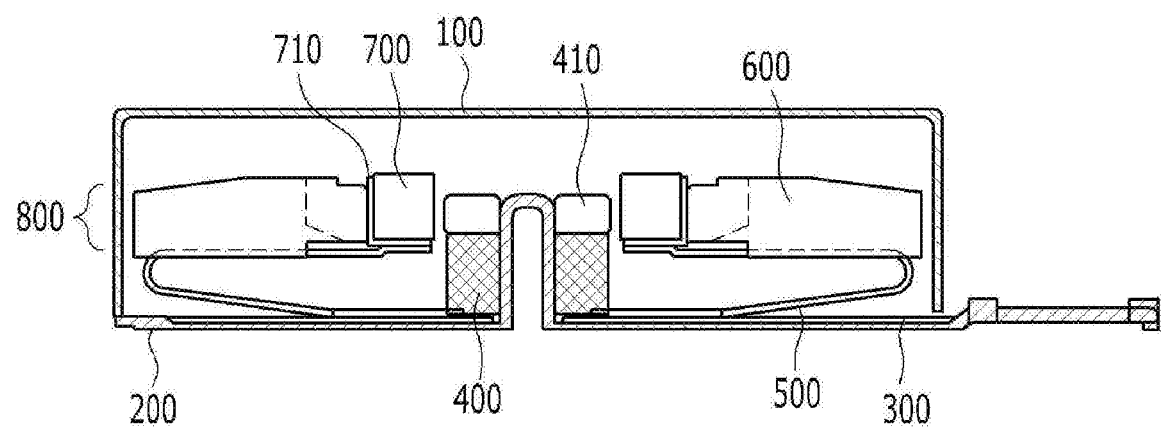
FIG. 8 is a front sectional view showing a linear vibration generator according to a second embodiment of the present invention.
Figure 9:
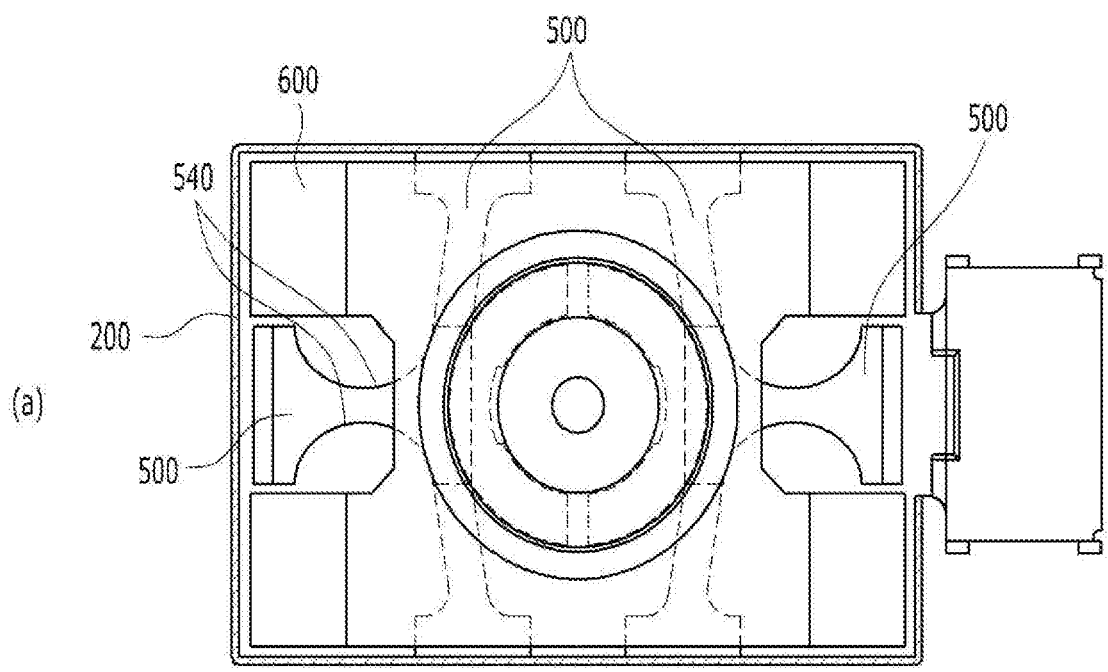
FIG. 9 is top views showing the linear vibration generator according to the second embodiment of the present invention.
Figure 9:
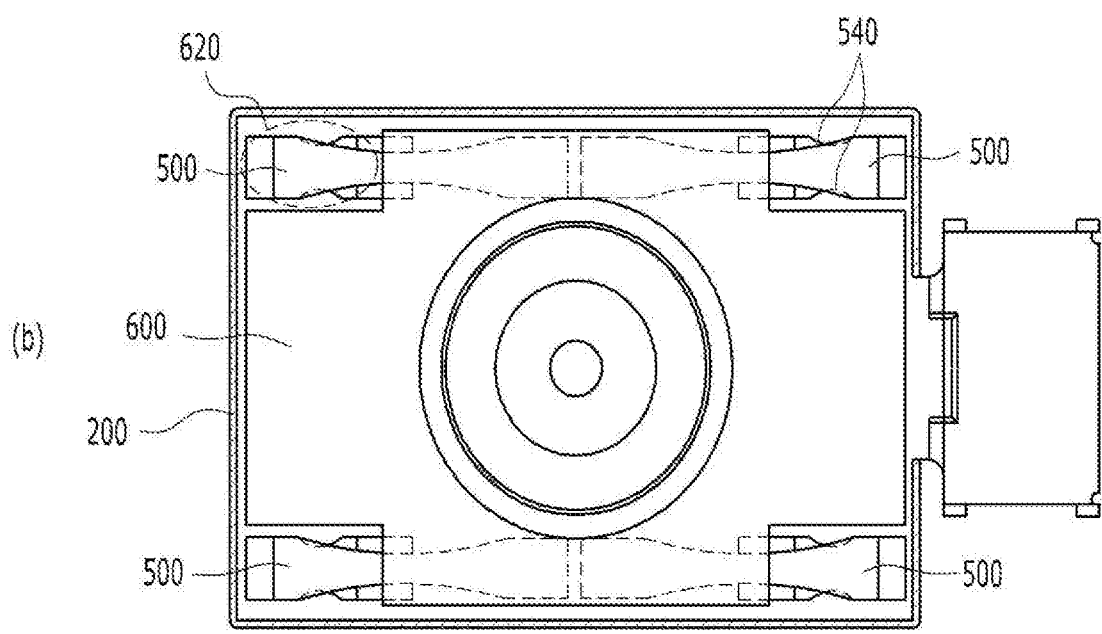

FIG. 8 is a front sectional view showing a linear vibration generator according to a second embodiment of the present invention, and FIG. 9 is top views showing the linear vibration generator according to the second embodiment of the present invention.

As shown in FIGS. 8 and 9, the linear vibration generator according to the second embodiment of the present invention is provided not with spiral-shaped springs, but with symmetrically structured plate type spring having a support cup 520 formed on a center portion thereof.

As shown in (a) of FIG. 9, the linear vibration generator according to the second embodiment of the present invention includes a case 100 for covering top and side portions thereof, a bracket 200 coupled to the underside of the case 100, a coil 400 fixed to one side of a top surface of the bracket 200 and receiving external power from an FPCB 300, a plate type spring 500 having bent portions 510 and a support cup 520 and configured to allow one end thereof to be fixed to a vibrator 800, and the vibrator 800 having a weight 600 fixed to one end of the plate type spring 500 and a magnet 700 insertedly fixed to a hollow portion 610 of the weight 600.

The weight 600 has second machined portions formed on both sides of the center thereof, and the formation of the second machined portions prevents the weight 600 from coming into contact with the bent portions of the plate type spring 500 upon the downward movement of the weight 600.

As shown in (b) of FIG. 9, on the other hand, the weight 600 has the first machined portions 620 formed on four corners thereof.

Now, the installation shape of two plate type sub-springs each having the support cup 520 will be in detail explained with reference to FIGS. 8 and 9.

Two plate type sub-springs each having the support cup 520 are symmetrically spaced apart from each other by a given distance around a center axis of the hollow portion 610 of the weight 600, and otherwise, an even number of plate type sub-springs are symmetrically spaced apart from each other.

Advantageously, the structural properties of the plate type spring having a symmetrical shape enable the vibrator 800 to stably move up and down, without any twist.

On the other hand, a magnet yoke 710 is disposed tops of the support cups 520 of the plate type sub-springs between the magnet 700 and the plate type sub-springs to allow the magnet 700 to be stably fixed to the plate type sub-springs, and a coil yoke 410 is disposed on top of the coil 400 to allow the magnetic field generated from the coil 400 to be focused thereonto to enhance a magnetic interaction efficiency between the magnet 700 and the coil 400.

In addition, each plate type sub-springs having the support cup 520 has one or more curved portions 540, and through the structures of the curved portions 540 reduced gently in width thereof, the bent portions 510 can operate efficiently.

Figure 10:
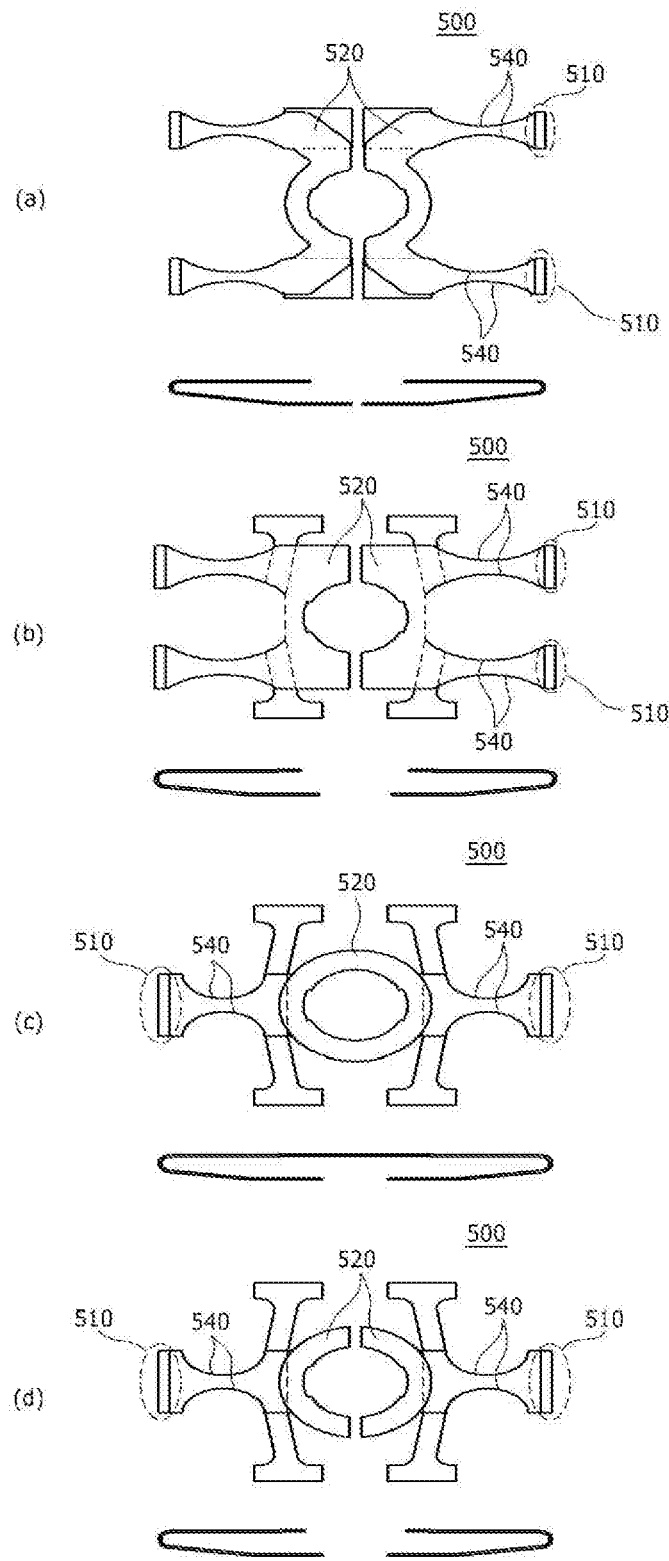
FIG. 10 is top and front views showing various plate type springs having support cups in the linear vibration generator according to the second embodiment of the present invention.

FIG. 10 is top and front views showing various plate type springs having the support cups in the linear vibration generator according to the second embodiment of the present invention.

As shown in (a) and (b) of FIG. 10, two plate type sub-springs each having the bent portions 510 and the support cup 520 are disposed symmetrically with each other, and in this case, the shapes of the plate type springs as shown in (a) and (b) of FIG. 10 are somewhat different from each other.

As shown in (c) of FIG. 10, the plate type spring 500 is formed of one unitary body having the two bent portions 510, one support cup 520 and a through hole 530, and as shown in (d) of FIG. 10, two plate type sub-springs each having one bent portion 510 and one support cup 520 are disposed symmetrically with each other.

Figure 11:
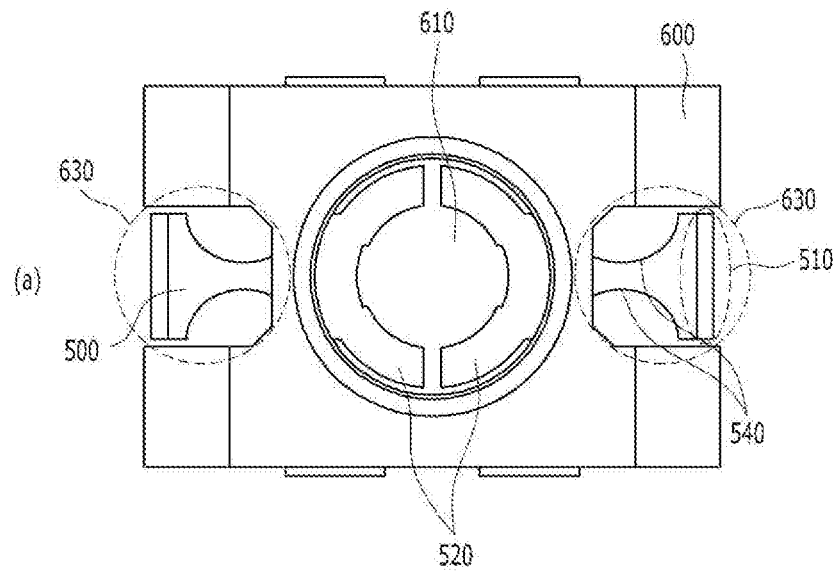
FIG. 11 is schematic views showing a coupling relationship between a weight and the plate type spring having the support cup in the linear vibration generator according to the second embodiment of the present invention.
Figure 11:
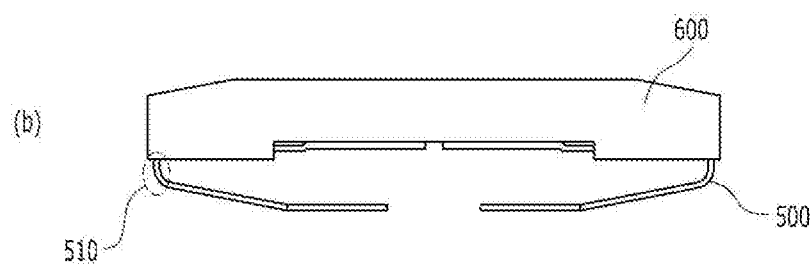
Figure 11:
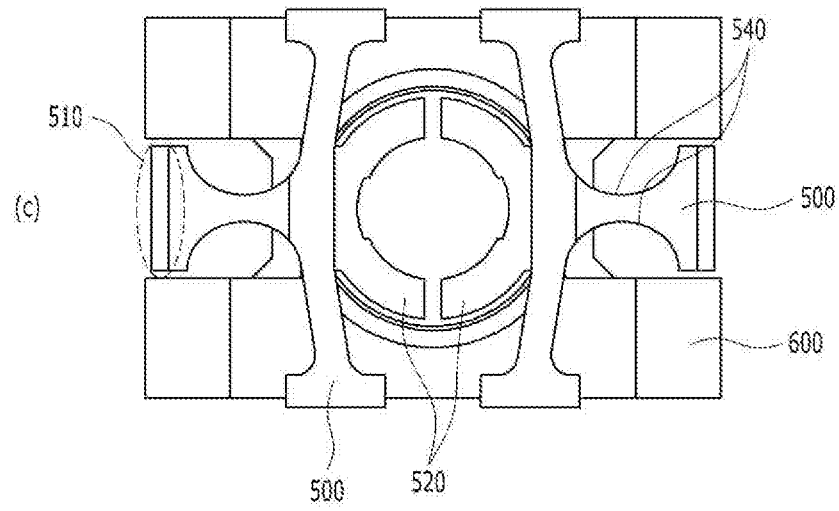

FIG. 11 is schematic views showing a coupling relationship between the weight and the plate type spring having the support cup in the linear vibration generator according to the second embodiment of the present invention.

FIG. 11 is top, front, and bottom views showing two plate type sub-springs each having the support cup, which are coupled to the weight. In detail, two plate type sub-springs each having the support cup 520 are coupled to the lower end of the weight 600, and the support cups 520 are extended from the bent portions 510 on the left and right sides of each plate type sub-spring toward the inside of the lower portion of the hollow portion 610 of the weight 600.

Even though not shown, the magnet 700 is located on tops of the support cups 520, and the magnet 700 is fixedly coupled to the weight 600.

The weight 600 has a shape of a rectangle and desirably includes first machined portions 620 formed on four corners thereof or at least two or more second machined portions 630 formed on both sides of the center thereof.

The formation of the first machined portions 620 or the second machined portions 630 prevents the weight 600 from coming into contact with the plate type spring 500 upon the downward movement of the weight 600.

Figure 12:
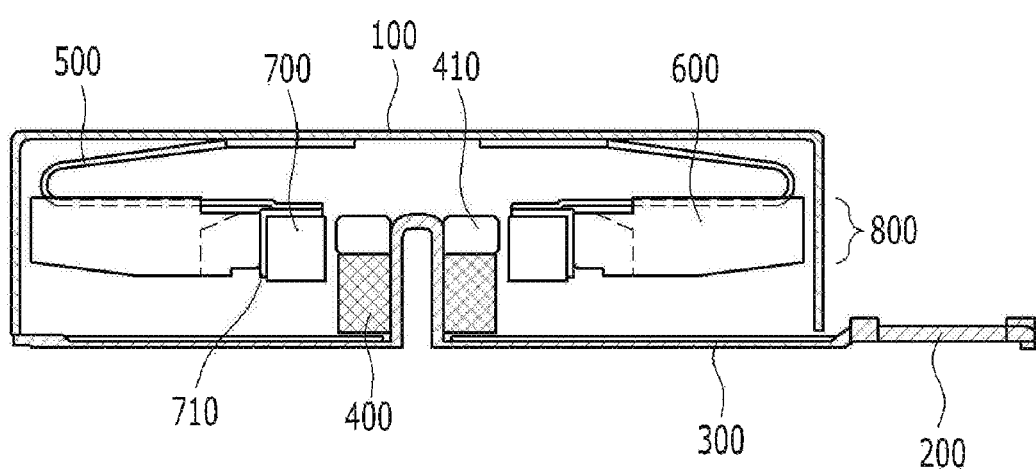
FIG. 12 is a front sectional view showing a linear vibration generator having a plate type spring located on a weight according to a third embodiment of the present invention.

FIG. 12 is a front sectional view showing a linear vibration generator according to a third embodiment of the present invention, wherein the plate type spring is fixed to an upper portion of a case and a weight hangs on the plate type spring.

As shown in FIG. 12, one end of each plate type sub-spring is coupled to the vibrator 800, and the other end thereof is fixed to the case 100. Contrarily, of course, one end of each plate type sub-spring is coupled to the vibrator 800, and the other end thereof is fixed to the bracket 200, so that the plate type spring 500 is located between the vibrator 800 and the bracket 200.

As described above, the linear vibration generator according to the present invention is configured to improve the structures of the springs disposed therein, thereby preventing the weight of the vibrator from coming into contact with the inner surface of the case due to the twist of the vibrator and avoiding unnecessary generation of noise and damage of the vibrator.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A linear vibration generator comprising:
    a case (100) for covering top and side portions thereof;
    a bracket (200) coupled to the underside of the case (100);
    a coil (400) fixed to one side of a top surface of the bracket (200) and receiving external power from an FPCB (300);
    a plate type spring (500) having bent portions (510) and a support cup (520) and configured to allow one end thereof to be fixed to a vibrator (800); and
    the vibrator (800) having a weight (600) fixed to one end of the plate type spring (500) and a magnet (700) insertedly fixed to a hollow portion (610) of the weight (600).

2. The linear vibration generator according to claim 1, wherein the plate type spring (500) is formed of one unitary spring having a through hole (530) formed on the center thereof to insert the coil (400) thereinto.

3. The linear vibration generator according to claim 1, wherein the support cup (520) is formed to be fixed to the magnet (700), while supporting the weight (600) thereagainst.

4. The linear vibration generator according to claim 1, wherein the plate type spring (500) is composed of an even number of plate type sub-springs symmetrical with and spaced apart from each other by a given distance around the center axis of the weight (600).

5. The linear vibration generator according to claim 1, wherein the weight (600) has a shape of a rectangle and comprises first machined portions (620) formed on four corners of the rectangular shape thereof or at least two or more second machined portions (630) formed on both sides of the center thereof.

* * * * *